(12) United States Patent		(10) Patent No.: US 8,005,509 B2
Huang et al.		(45) Date of Patent: Aug. 23, 2011

(54) SIM CARD SECURING MECHANISM FOR MOBILE PHONE

(75) Inventors: Ming-Te Huang, Taipei (TW); Ting-Fang Hsieh, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 745 days.

(21) Appl. No.: 12/045,752

(22) Filed: Mar. 11, 2008

(65) Prior Publication Data

US 2008/0227492 A1    Sep. 18, 2008

(30) Foreign Application Priority Data

Mar. 12, 2007  (TW) .............................. 96108451 A

(51) Int. Cl.
*H04B 1/38* (2006.01)
*H04M 1/00* (2006.01)
(52) U.S. Cl. .................. 455/558; 455/575.1; 455/550.1
(58) Field of Classification Search .................. 455/558, 455/550.1, 557, 90.3, 575.1; 439/326, 331, 439/630
See application file for complete search history.

(56) References Cited

U.S. PATENT DOCUMENTS

| 6,397,081 B1 * | 5/2002 | Franck et al. ................. 455/558 |
| 6,876,552 B2 * | 4/2005 | Pan et al. ...................... 361/730 |
| 6,884,102 B2 * | 4/2005 | Rumpel et al. ................ 439/331 |
| 7,093,764 B1 * | 8/2006 | Valenzuela et al. ........... 235/486 |
| 7,118,419 B1 | 10/2006 | Lee |

FOREIGN PATENT DOCUMENTS

| CN | 1466352 | 1/2004 |
| CN | 2746595 | 12/2005 |

OTHER PUBLICATIONS

English language translation of abstract of CN 1466352 (published Jan. 7, 2004).
English language translation of abstract of CN 2746595 (published Dec. 14, 2005).

* cited by examiner

*Primary Examiner* — Sonny Trinh
(74) *Attorney, Agent, or Firm* — Thomas, Kayden, Horstemeyer & Risley, LLP

(57) ABSTRACT

A SIM card securing mechanism for a mobile phone is described. A phone body has several positioning holes. One side of the securing plate is pivoted in the body to allow the securing plate to swivel relatively to the phone body. The securing plate has a plurality of elastic arms each of which has a protrusion. The securing plate is capable of being swiveled to a securing position relatively to the phone body to allow the protrusions to be fastened to the corresponding positioning holes via the elasticity of the elastic arms. Thus, the SIM card is sandwiched between the securing plate and the phone.

7 Claims, 2 Drawing Sheets

SIM CARD SECURING MECHANISM FOR MOBILE PHONE

RELATED APPLICATIONS

This application claims priority to Taiwan Application Serial Number 96108451, filed Mar. 12, 2007, which is herein incorporated by reference.

BACKGROUND

1. Field of the Invention

The invention relates to a subscriber identity module (SIM) card securing mechanism for a mobile phone.

2. Description of the Related Art

A SIM card of a mobile phone stores a user's related identifying data in the mobile communication network to allow the user to use the same number when the mobile phone is replaced. After the SIM card is inserted into a mobile phone, the mobile phone can be used to make a phone call only when the SIM card is well electrically connected to the contacts in the mobile phone. To ensure that the SIM card is well electrically connected to the mobile phone, the SIM card should be properly secured. Therefore, how to properly secure the SIM in the mobile phone is an important subject for every mobile phone manufacturer.

BRIEF SUMMARY OF THE INVENTION

The objective of the invention is to provide a SIM card securing mechanism for a mobile phone.

According to the objective of the invention, a SIM card securing mechanism for a mobile phone is provided. The SIM card securing mechanism includes a phone body and a securing plate. The phone body has a plurality of positioning holes. One side of the securing plate is pivoted to the phone body to allow the securing plate to swivel relatively to the phone body. The securing plate has a plurality of elastic arms each of which has a protrusion. The securing plate is capable of being swiveled to a securing position relatively to the phone body to allow the protrusions to be fastened to the positioning holes of the phone body via the elasticity of the elastic arms. Thus, the SIM card is sandwiched between the securing plate and the phone body steadily.

These and other features, aspects, and advantages of the present invention will become better understood with regard to the following description, appended claims, and accompanying drawings.

DETAILED DESCRIPTION OF THE EMBODIMENTS

As stated above, the invention provides a SIM card securing mechanism for a mobile phone. The SIM card is sandwiched between a securing plate and a phone body via the securing plate pivoted to the phone body. In the embodiment of the invention, each of the two sides of the securing plate has a pair of elastic arms to allow protrusions to be fastened in the positioning holes in the phone body and hold the SIM card between the securing plate and the phone body.

Figure 1:
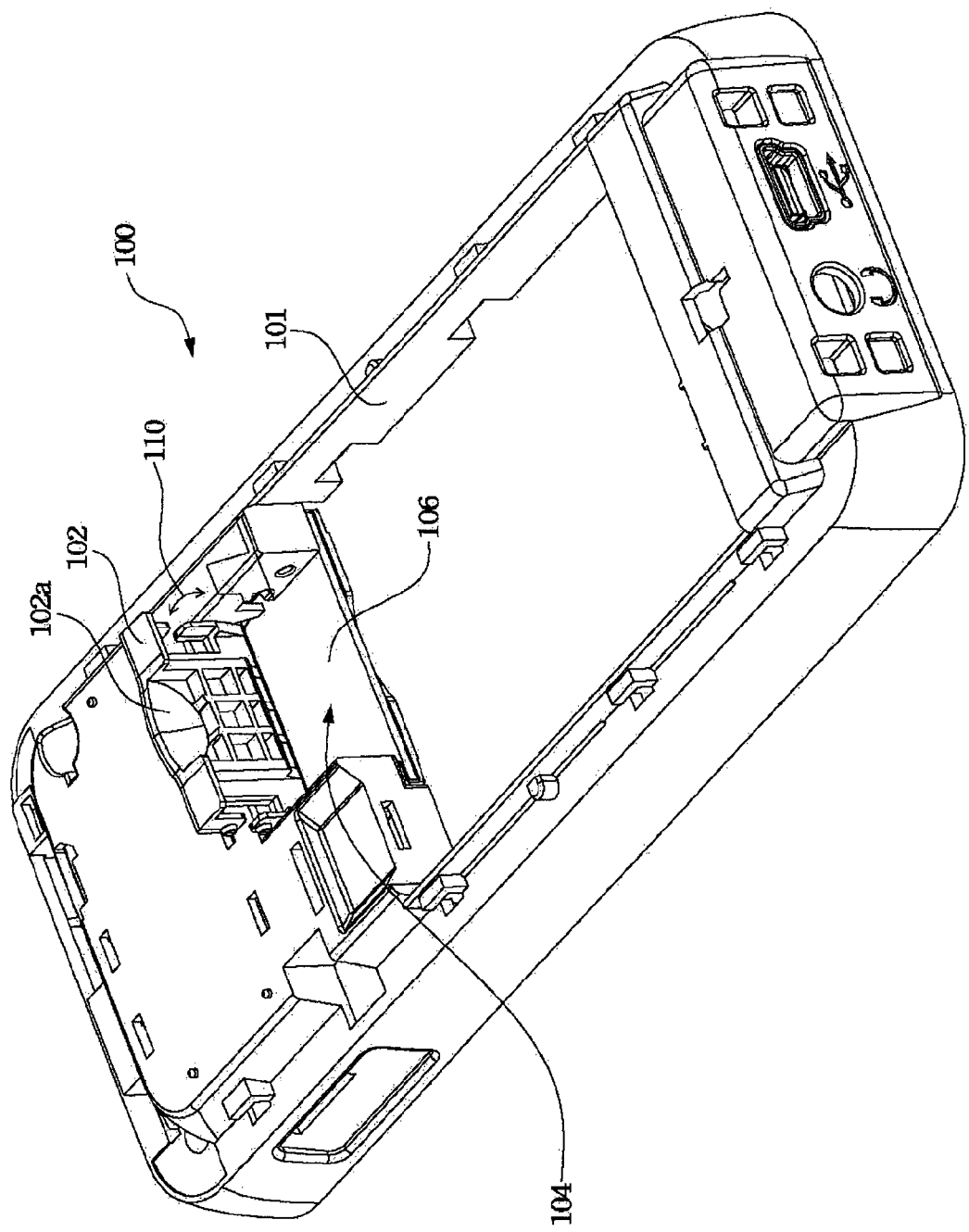
FIG. 1 is a SIM card securing mechanism for a mobile phone according to one preferred embodiment of the invention.

FIG. 1 is a SIM card securing mechanism for a mobile phone according to a preferred embodiment of the invention. FIG. 1 shows the state that the casing is removed from the back of the phone body 101 (the surface having no display) of the mobile phone 100. In the embodiment, the SIM card securing mechanism is designed at the back of the mobile phone. One side of the securing plate 102 is pivoted in the recess 104 of the phone body 101. Therefore, a user may apply force to a handle 102a of the securing plate 102 and swivel the securing plate 102 along the direction 110. When the securing plate 102 is swiveled to be parallel to the bottom surface 106 of the recess 104 and is secured, the SIM card is sandwiched between the securing plate 102 and the bottom surface 106 of the recess 104. When the securing plate 102 is swiveled to leave the recess 104, the SIM card may be taken out by the user.

Figure 2:
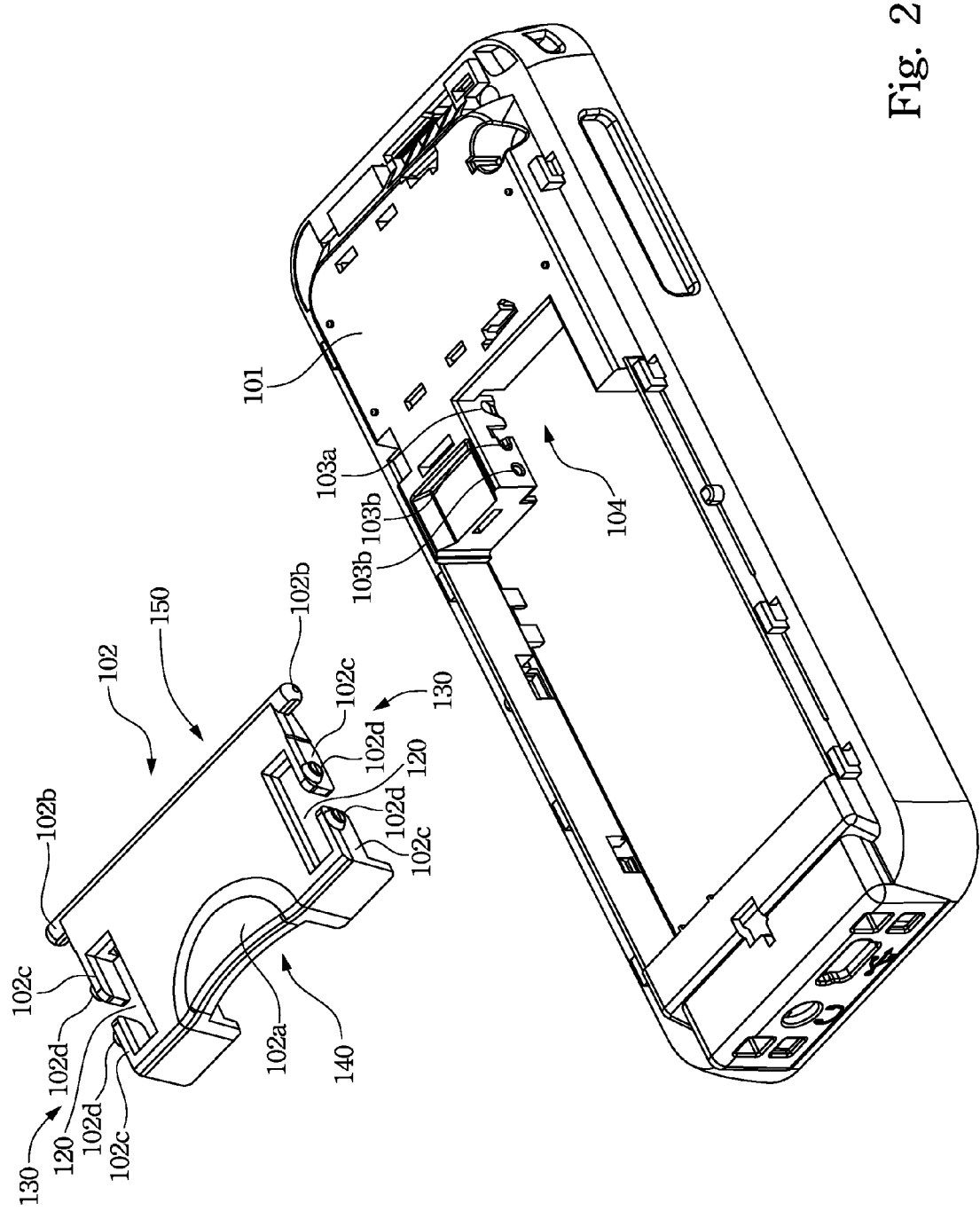
FIG. 2 is an exploded diagram showing a SIM card securing mechanism for a mobile phone according to one preferred embodiment of the invention.

FIG. 2 is an exploded diagram showing the SIM card securing mechanism for a mobile phone according to one preferred embodiment of the invention. FIG. 2 shows the state that the securing plate 102 is separated from the phone body 101. The securing plate 102 may roughly be a rectangular plate. One side of the securing plate 102 having the rotating pivot 102b is pivoted to the pivoting holes 103a at the two sides of the recess 104 (only one side is shown in FIG. 2). The securing plate 102 further includes a handle 102a provided at the side (handle side 140) opposite to the pivoting side 150 (the side having the rotating pivot 102b). Each of the other two sides (two elastic arm sides 130 between the pivoting side 150 and the handle side 140; a pair of sides adjacent to the pivoting side 150 rather than opposite to the pivoting side 150) of the securing plate 102 has a pair of elastic arms 102c and an indentation portion 120, and the elastic arms 102c are extending from the two sides of the indentation portion 120. One of the elastic arms 102c is extending toward the other one of the elastic arm 102c. Hence, the elastic arms 102c are extending from the two sides of the indentation portion 120 toward each other. Each elastic arm 102c has a protrusion 102d. The protrusions 102d is allowed to be fastened into or separated from the positioning holes 103b (only one side shown in FIG. 2) at the two sides of the recess 104 via the shape (circular inclined surface) of the protrusions 102d and the elasticity of the elastic arms 102c.

From the preferred embodiment of the invention, SIM card securing mechanism of the invention has a plurality of elastic arms and protrusions for positioning the securing plate. Therefore, even if one elastic arm or one protrusion is damaged, the function of securing the SIM card is also performed.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A SIM card securing mechanism for a mobile phone comprising:
   a phone body having a plurality of positioning holes; and
   a securing plate having a pivoting side, at least one elastic arm side and a handle side, wherein the pivoting side is pivoted to the phone body, a plurality of elastic arms are formed on the at least one elastic arm side, each of the elastic arms has a protrusion, the at least one elastic arm side is formed between the pivoting side and the handle side, and the handle side is opposite to the pivoting side, wherein the securing plate is capable of being swiveled to a securing position relatively to the phone body to allow the protrusions to be fastened to the corresponding positioning holes of the phone body via the elasticity of the elastic arms, and then a SIM card is sandwiched between the securing plate and the phone body steadily.

2. The SIM card securing mechanism according to claim 1, wherein the two terminals of the pivoting side are connected to a plurality of pivoting holes of the phone body to allow the pivoting side to be pivoted to the phone body, the two terminals are extending outwardly and parallel to the protrusions of the elastic arms, and the protrusions of the elastic arms are also extending outwardly.

3. The SIM card securing mechanism according to claim 1, wherein the phone body comprises a recess, and the positioning holes are in the recess.

4. The SIM card securing mechanism according to claim 3, wherein the securing plate is pivoted in the recess.

5. The SIM card securing mechanism according to claim 3, wherein when the protrusions are fastened to the corresponding positioning holes of the phone body via the elasticity of the elastic arms, the securing plate is parallel to the bottom surface of the recess.

6. The SIM card securing mechanism according to claim 1, wherein the handle side comprises a handle for a user to apply force.

7. The SIM card securing mechanism according to claim 1, wherein the at least one elastic arm side further comprises an indentation portion, and the at least one elastic arm side is extending from two sides of the indentation portion toward each other.

* * * * *